(12) United States Patent
Murata et al.

(10) Patent No.: US 6,511,721 B1
(45) Date of Patent: Jan. 28, 2003

(54) ANTI-REFLECTIVE MATERIAL

(75) Inventors: Makoto Murata, Shizuoka (JP);
Kensaku Higashi, Shizuoka (JP)

(73) Assignee: Tomoegawa Paper Co., Ltd., Tokyo (JP)

( * ) Notice: Subject to any disclaimer, the term of this patent is extended or adjusted under 35 U.S.C. 154(b) by 189 days.

(21) Appl. No.: 09/628,041

(22) Filed: Jul. 28, 2000

(30) Foreign Application Priority Data

Aug. 4, 1999 (JP) ............................................. 11-221318

(51) Int. Cl.$^7$ ........................... B32B 17/06; B32B 33/00
(52) U.S. Cl. ....................... 428/1.3; 428/1.32; 428/336; 428/422; 428/448
(58) Field of Search ................................. 428/1.3, 1.32, 428/336, 422, 448

(56) References Cited

U.S. PATENT DOCUMENTS 5,759,643 A * 6/1998 Miyashita et al. ......... 428/1.31

* cited by examiner

Primary Examiner—Paul Thibodeau
Assistant Examiner—Ramsey Zacharia
(74) Attorney, Agent, or Firm—Nixon & Vanderhye P.C.

(57) ABSTRACT

The present invention provides an anti-reflective material with good the stainproofing properties, wherein dust and fingerprints do not readily adhere to the surface and can be easily wiped off when adhered, the anti-reflective material being provided with a stainproofing layer having excellent durability of its stainproofing effect. In an anti-reflective material comprising a transparent substrate and a low-refractive index layer and a stainproofing layer laminated in order on the transparent substrate, the low-refractive index layer is a silica film formed by the sol-gel method, and the stainproofing layer contains at least a perfluoroalkyl ether compound.

9 Claims, No Drawings

ANTI-REFLECTIVE MATERIAL

BACKGROUND OF THE INVENTION

1. Field of the Invention

The present invention relates to an anti-reflective material having particularly excellent display stainproofing properties, durability anci anti-reflective properties, which is suited for use in displays such as CRTS, LCDs, and PDPs.

2. Description of Related Art

With the recent development of displays such as CRTs, LCDs, and PDPs, various types of equipment incorporating these displays are used in various fields. When using such equipment in places exposed to comparatively bright light such as outdoors, problems such as reflections from external light such as sunlight and light from fluorescent lamps in the display have increased. Therefore, it is strongly required to prevent the reflection of external light on display surfaces, that is, to prevent reflection.

Therefore, display surface are frequently provided with anti-reflective films to improve their visibility. Such anti-reflective films are generally formed by providing the surface with a material having a refractive index lower than that of a lower layer in an optical film thickness which is n/4 times (wherein n is an odd number) as large as the wavelength of the light of interest. As the method of forming this outermost layer, for example, there can be used a method of forming the layer by deposition or sputtering of materials such as magnesium fluoride and silica, a method of coating a coating solution prepared by dispersing these materials, and a method of forming a fluorine-based polymer film by deposition and coating.

However, the anti-reflective film according to the above prior art has the problems that adhesion of dust or oily substances in the atmosphere to the surface of the substrate or adhesion of fingerprints is liable to quickly show as soiling. For example, stains on the surface of transparent glass or plastic impairs the appearance of display window glass, impairs the field of view in case of eyeglasses, and prevents safe driving in case of vehicle windows. Furthermore, for optical instruments such as cameras, stains impair their performance. Therefore, there has been demand for an anti-reflective film to which stains do not readily adhere, and from which stains can be easily removed once they adhere.

To prevent stains, various methods have hitherto been suggested. For example, Japanese Unexamined Patent Application, First Publication No. Sho 58-142958, Japanese Unexamined Patent Application, First Publication No. Sho 58-147483, and Japanese Unexamined Patent Application, First Publication No. Sho 58-147484 disclose that a water- and oil-repellent agent for glass surfaces, comprising a polyfluoroalkyl group-containing silane compound or a partially hydrolyzed condensate thereof, water-glass or a silane coupling agent and colloidal silica, is effective. Japanese Unexamined Patent Application, First Publication No. Sho 60-49079 discloses a fingerprint adhesion inhibitor comprising a compound having a $C_{4-21}$ polyfluoroalkyl group or a polyfluoroether group. Japanese Unexamined Patent Application, First Publication No. Hei 4-89877 discloses a protective water-repellent composition for coating of vehicles, comprising an organic solvent-soluble organopolysiloxane resin partially having a perfluoroalkyl group and a lubricant oil which is insoluble in water. Japanese Unexamined Patent Application, First Publication No. Hei 5-125083 discloses a method of preparing a surface treating agent by reacting a tetraalkoxide of Ti or Zr with a fluorine-containing alkyl silane compound. Furthermore, Japanese Unexamined Patent Application, First Publication No. Hei 9-157582 discloses a stainproofing base material comprising a base material, and a layer of a silicon-containing organic fluoropolymer with a specific structure having a perfluoropolyether group which is formed on the surface of the base material.

In Japanese Unexamined Patent Application, First Publication No. Hei 9-127307, an anti-reflective filter coated with perfluoroether having a polar group at a terminal and a display device are suggested for stainproofing properties of a single-layer or multi-layer anti-reflective film comprising as a principal component silicone dioxide formed on a transparent substrate by a vacuum deposition or sputtering method, as an example wherein special attention is paid to use for displays. Furthermore, a stainproofing film containing alkoxysilane compound with a specific structure having a perfluoropolyether group is disclosed in Japanese Unexamined Patent Application, First Publication No. Hei 9-255919 and a surface modified film and a filter for display device, which are obtained by using the alkoxysilane compound having a perfluoropolyether group in combination with various materials are disclosed in Japanese Unexamined Patent Application, First Publication No. Hei 9-326240, Japanese Unexamined Patent Application, First Publication No. Hei 10-26701, Japanese Unexamined Patent Application, First Publication No. Hei 10-120442, and Japanese Unexamined Patent Application, First Publication No. Hei 10-148701.

However, the above-mentioned prior arts with respect to the stainproofing properties have the following problems. That is, when various fluorine-containing compounds having stainproofing properties for an outermost layer of the anti-reflective material are applied to a low-refraction index layer made of silicon dioxide formed by a deposition or sputtering method, the anti-reflective properties are impaired and the stainproofing properties, particularly the durability in stainproofing properties, are poor. The reason is that the stainproofing effect is reduced over time, though excellent stainproofing properties are retained shortly after coating of the fluorine compound. It has also been found that conventional stainproofing measure have the problem that, when stains adhering to a base material coated with a stainproofing component are wiped off repeatedly, the stainproofing component is also wiped off, and the stainproofing properties are reduced, namely, contact adhesion between the low-refractive index layer and the stainproofing coated film is poor.

BRIEF SUMMARY OF THE INVENTION

Thus, an object of the present invention is to provide an anti-reflective material which is provided with a stainproofing layer having excellent durability of the stainproofing effect without exerting an adverse effect on the stainproofing capability.

The present inventors have carried out intensive studies to improve the stainproofing properties of the display surface, thus attaining the above object by the following method. That is, the present invention provides an anti-reflective material comprising a transparent substrate and at least a low-refractive index layer and a stainproofing layer laminated in order on said transparent substrate, wherein said low-refractive index layer is a silica film formed by the sol-gel method, and said stainproofing layer contains at least a perfluoroalkyl ether compound. The present invention also provides an anti-reflective material film using, as the perfluoroalkyl ether compound, a compound having one or more functional groups having high affinity with silica and/or chemically bonding functional groups at the molecular terminal.

The anti-reflective material of the present invention can easily exhibit excellent stainproofing properties, durability, and anti-reflective properties when used as a display.

DETAILED DESCRIPTION OF THE INVENTION

The stainproofing layer in the present invention contains at least a perfluoroalkyl ether compound, and the compound serves as a stainproofing component which substantially exhibits stainproofing properties and a compound having a perfluoroalkyl ether group is appropriately used. Among these compounds, a compound having one or more functional groups having high affinity with a silica film described hereinafter and/or chemically bonding functional groups at the molecular terminal is preferable. Examples of the perfluoroalkyl compounds are compounds represented by the following formulae 1 and 2.

|  |  |
|---|---|
| Rf-R$^1$-X$^1$ | formula 1 |
| X$^2$-R$^2$-Rf-R$^1$-X$^1$ | formula 2 |

(In the formulae, Rf represents a perfluroroalkyl ether group, R$^1$ and R$^2$ represent a divalent organic group, X$^1$ and X$^2$ represent a monovalent group having a functional group having high affinity with silica and/or a chemically bonding functional group, and R$^1$ and R$^2$, X$^1$ and X$^2$ may be the same or different).

R$^1$ and R$^2$ in the above formulae are not particularly limited. However, examples thereof include —R$^3$—, —R$^3$—COO—R$^4$—, —R$^3$—CONH—R$^4$—, and —R$^3$—O—R$^4$— (wherein R$^3$ and R$^4$ represent a direct bond, a C$_1$ to C$_6$ alkylene group, a phenylene group, a naphthalene group, or a combination of these, and R$^3$ and R$^4$ may be the same or different). In addition, the above alkylene, phenylene, and naphthalene groups may have a substituent group.

The molecular structure of the perfluoroalkyl ether group is not specifically limited, but a monovalent or divalent perfluoroalkyl ether group containing a C$_1$–C$_3$ perfluoroalkyloxy group as a repeating unit is preferable, and specific examples thereof include the following. In the following chemical structure, n and m represent an integer of 1 or more. In addition, in the formula having both n and m, either n or m may be 0.

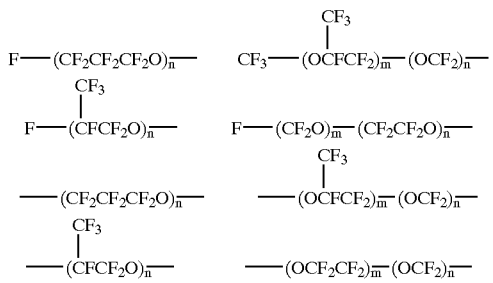

It is said that functional groups such as hydroxyl group and silanol group are exposed on the surface of the silica film constituting the low-refractive index layer. Accordingly, it is effective that the stainproofing component having a perfluoroalkyl ether group have one or more functional groups having high affinity with silica and/or chemically bonding functional groups at the molecular terminal so as to have a high cohesive force with the silica film. Functional groups which have a high affinity are those groups capable of cohering by an ionic bond or a van der Waals force, and specific examples thereof include carboxyl groups, carboxylate groups, phosphoric groups, phosphate groups, sulfonic groups, sulfonate groups, hydroxyl groups, amino groups, imino groups, ammonium salt groups, amide groups, and thiol groups. The chemically bonding functional groups include, for example, isocyanate groups capable of bonding with the hydroxyl group of the silica film, chlorosilyl groups capable of bonding with a silanol group, and alkoxysilyl groups. To the silica film constituting the anti-reflective material of the present invention, carboxyl groups, isocyanate groups, and alkoxysilyl groups are preferable, and alkoxysilyl groups are particularly preferable. The perfluoroalkyl ether compound preferably has one or more functional groups in the molecule, and can have same or two different functional groups in the case of a divalent perfluoroalkyl ether group.

The perfluoroalkyl ether group and functional group having high affinity with silica and/or chemically bonding functional group are bonded directly or bonded through a proper divalent atom or group. However, these molecular structures are not specifically limited and can be selected according to the ease of synthesis. The bonding group includes, for example, atoms or atomic groups such as O, NH, and S., and alkylene groups, phenylene groups, alkyl ether groups, carbonyl groups, ester groups, and amide groups. These bonding groups can be used alone or in combination.

Examples of the perfluoroalkyl ether compound which can be used in the present invention are listed as follows.

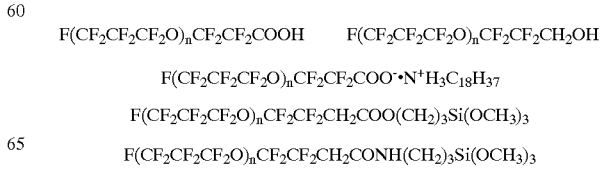

-continued

F(CF$_2$CF$_2$CF$_2$O)$_n$CF$_2$CF$_2$CH$_2$CONHArSi(OCH$_3$)$_3$

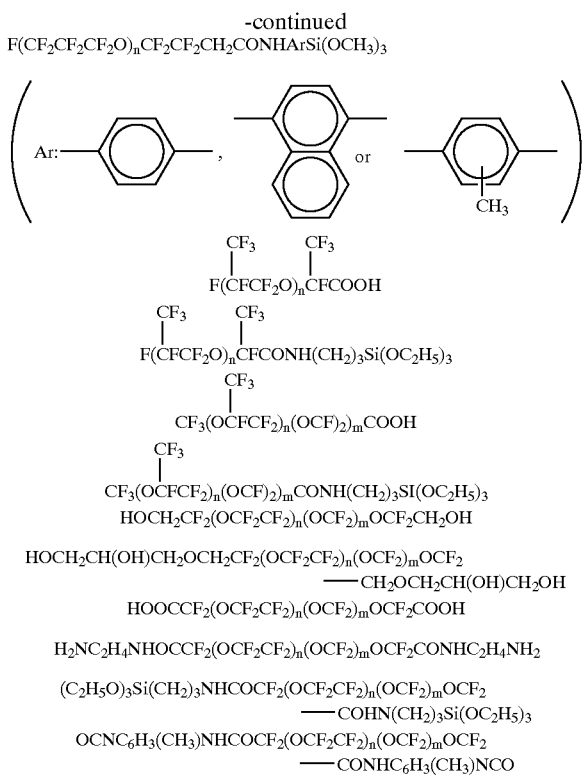

F(CFCF$_2$O)$_n$CFCOOH with CF$_3$, CF$_3$ substituents

F(CFCF$_2$O)$_n$CFCONH(CH$_2$)$_3$Si(OC$_2$H$_5$)$_3$ with CF$_3$, CF$_3$ substituents CF$_3$(OCFCF$_2$)$_n$(OCF$_2$)$_m$COOH with CF$_3$ CF$_3$(OCFCF$_2$)$_n$(OCF$_2$)$_m$CONH(CH$_2$)$_3$SI(OC$_2$H$_5$)$_3$ with CF$_3$ HOCH$_2$CF$_2$(OCF$_2$CF$_2$)$_n$(OCF$_2$)$_m$OCF$_2$CH$_2$OH HOCH$_2$CH(OH)CH$_2$OCH$_2$CF$_2$(OCF$_2$CF$_2$)$_n$(OCF$_2$)$_m$OCF$_2$
—CH$_2$OCH$_2$CH(OH)CH$_2$OH HOOCCF$_2$(OCF$_2$CF$_2$)$_n$(OCF$_2$)$_m$OCF$_2$COOH H$_2$NC$_2$H$_4$NHOCCF$_2$(OCF$_2$CF$_2$)$_n$(OCF$_2$)$_m$OCF$_2$CONHC$_2$H$_4$NH$_2$ (C$_2$H$_5$O)$_3$Si(CH$_2$)$_3$NHCOCF$_2$(OCF$_2$CF$_2$)$_n$(OCF$_2$)$_m$OCF$_2$
—COHN(CH$_2$)$_3$Si(OC$_2$H$_5$)$_3$ OCNC$_6$H$_3$(CH$_3$)NHCOCF$_2$(OCF$_2$CF$_2$)$_n$(OCF$_2$)$_m$OCF$_2$
—CONHC$_6$H$_3$(CH$_3$)NCO The perfluoroalkyl ether compound used in the present invention is not limited thereto, and two or more kinds can be used in combination. Furthermore, the molecular weight of these compounds is preferably within the range of 500–10000, and more preferably within the range of 500–4000. When the molecular weight is 500 or less, sufficient durability of stainproofing properties is not exhibited. On the other hand, when the molecular weight is 10000 or more, the solubility in a solvent is lowered, thereby making it difficult to form a uniform stainproofing layer.

The above compound itself shows a low refractive index because it contains many fluorine atoms in the molecule. Accordingly, a reduction in reflectance can also be expected without inhibiting the anti-reflective performance attained by the presence of the low-refractive index layer as the lower layer.

The stainproofing layer in the present invention is formed by coating and drying a solution prepared by dissolving at least the compound described above in the solvent. The coating weight of the compound is preferably within a range of 0.1–50 nm, and more preferably within a range of 0.5–20 nm, in terms of the thickness of the stainproofing layer. When the thickness is 0.1 nm or less, the function of the stainproofing properties is not exhibited. On the other hand, when the thickness exceeds 50 nm, sufficient stainproofing properties are obtained, but the coated surface is slightly sticky, and it is not economical. To prepare a coating composition for forming the stainproofing layer in the present invention, the concentration of the solution of a stainproofing active component is first decided considering the composition, coating method, and coated film thickness of a silica film, and then, based on the concentration, a fluorine-based solvent is selected, and an composition ratio is determined.

It is necessary that the solvent used in the coating composition for forming the stainproofing layer have sufficient solubility to form a uniform stainproofing layer and a boiling point suitable for coating. Solvents capable of dissolving the perfluoroalkyl ether compound as the stainproofing component include halogen-based solvents and fluorine-based solvents, but are preferably selected fully considering safety to the human body, lifetime in the atmosphere, ozone depletion potential, global warming potential, and possibility of being a cause of photochemical smog. From such a point of view, hydrofluorocarbons (HFC) and hydrofluoro ethers (HFE) are preferably used as the fluorine-based solvent in the present invention. HFC is basically composed of hydrogen, fluorine, and carbon atoms, while HFE further contains oxygen atoms in ether groups in the molecule. These solvents include, but are not limited to, "VERTREL XF" (CF$_3$CHFCHFCF$_2$CF$_3$: bp. 55° C.) which is a trade name of Du Pont Co.; "ZEORORA H" (heptafluorocyclopentane: bp. 82.5° C.) which is a trade name of Nippon Zeon Co., Ltd.; and "HFE-7100" (C$_4$F$_9$OCH$_3$: bp. 60° C.) and "HFE-7200" (C$_4$F$_9$OC$_2$H$_5$: bp. 78° C.) which are trade names of 3M Co. These solvents are excellent solvents, which show high safety because they are free from halogen atoms other than fluorine and show zero ozone depletion potential as compared with other fluorine-based solvents as shown in the following table, and which show global warming potential smaller than that of a conventional fluorine-based solvent by one order of magnitude and cause no photochemical smog.

TABLE 1

| Fluorine-based solvents Trade name | Ozone depletion potential *1 | Lifetime in the atmosphere (years) *2 | Global warming potential *3 | Remarks |
|---|---|---|---|---|
| VERTREL XF | 0 | 17.1 | 1300 | HFC |
| ZEORORA H | 0 | 3.4 | 250 | HFC |
| HFE-7100 | 0 | 4.1 | 500 | HFE |
| HFE-7200 | 0 | 0.9 | 100 | HFE |
| FREON TF | 0.8 | 85 | 5000 | Chlorofluorocarbon (CFC) |
| HCFC-225 | 0.025–0.033 | — | — | Hydrochlorofluorocarbon (HCFC) |
| (C$_6$F$_{14}$) | 0 | 3200 | 6800 | Perfluorocarbon (PFC) |

*1: Ozone depletion potential of each substance assuming that CFC-11 (Flon 11) has the ozone depletion potential of 1.
*2: Period required to reduce by a factor of 1/e in the atmosphere.
*3: Global warming potential integrated for 100 years assuming that CO$_2$ has a global warming potential of 1.

In the present invention, one or more solvents selected from these solvents can be used alone or in combination. Since these fluorine-based solvents have a cost higher than that of a conventional solvent by one or more orders of magnitude, the cost can also be reduced by diluting with an inexpensive non-fluorine-based solvent on use.

The non-fluorine-based solvents used in the present invention may be those which are compatible with the above fluorine-based solvent among conventional solvents used in normal coatings and which serve as so-called diluents for reducing the amount of an expensive fluorine-based solvent. These solvents themselves hardly dissolve the perfluoroalkyl ether compound, but the solubility can be improved by mixing with the fluorine-based solvent without impairing the excellent solubility of the fluorine-based solvent. Specifically, there can be used alcohol-based solvents such as methanol, ethanol, isopropanol (IPA), and sec-butyl alcohol; ketone-based solvents such as acetone, methyl ethyl ketone (MEK), and methyl isobutyl ketone (MIBK); ester-based solvents such as ethyl acetate, isopropyl acetate, and butyl acetate; ether-based solvents such as diisopropyl ether, dibutyl ether, tetrahydrofuran (THF), methyl cellosolve, and ethyl cellosolve; aliphatic hydrocarbon-based solvents such as hexane, cyclohexane, methylcyclohexane, heptane, and octane; and aromatic hydrocabon-based solvents such as benzene, toluene, and xylene. These non-fluorine-based solvents can also be used alone or in combination.

As the fluorine-based and non-fluorine-based solvents in the present invention, those having a boiling point of 50 to 150° C. are preferable. When the boiling point is 50° C. or lower, unevenness of coating is liable to occur because of excessive volatility of the solvent, and the operation environment becomes inferior. On the other hand, it is economically disadvantageous to use a solvent having a boiling point of 150° C. or higher because drying it requires much energy and time, and the solvent can sometimes not be applied to a plastic film having poor heat resistance. Furthermore, a difference in boiling point between the fluorine-based solvent and non-fluorine-based solvent is preferably 50° C. or less. The reason is as follows. When the difference in boiling point between both solvents is larger than 50° C. or more, the evaporation behavior of the solvent on coating and drying differs so that defects such as unevenness of the coating occur.

When using a mixed solvent in the present invention, the amount of the fluorine-based solvent contained in the mixed solvent is preferably 1% by weight or more. When the amount of the fluorine-based solvent is 1% by weight or less, it becomes impossible to dissolve the stainproofing agent in a sufficiently stable manner.

The optimum amount of the perfluoroalkyl ether compound contained in the coating composition for the stainproofing layer in the present invention cannot be unconditionally decided because it varies depending on the low-refractive index layer and coating method described hereinafter, but is preferably within a range of 0.01–10% by weight, and more preferably within a range of 0.03–1% by weight. When the amount is 0.01% by weight or less, sufficient stainproofing properties cannot be imparted to the stainproofing layer even if when coated with the resulting coating composition. On the other hand, when the amount exceeds 10% by weight, stickiness occurs, due to an excess of the stainproofing component, and it is economically disadvantageous.

In the present invention, various materials can be added to the stainproofing layer, in addition to the above materials, for the purpose of further enhancing the stainproofing properties, lowering the frictional force, enhancing the abrasion resistance and improving the wettability with the low-refractive index layer. Specific examples thereof include various silane coupling agents, titanate coupling agents, silicone oils, silicone resins, and surfactants.

Usable silane coupling agents include, for example, vinyltrichlorosilane, vinyltrimethoxysilane, vinyltriethoxysilane, vinyltris(β-methoxyethoxy)silane, vinyltriacetoxysilane, β-(3,4-epoxycyclohexyl)ethyltrimethoxysilane, γ-glycidoxypropyltrimethoxysilane, γ-glycidoxypropylmethyldiethoxysilane, γ-glycidoxypropylmethyldimethoxysilane, γ-methacryloxypropyltrimethoxysilane, γ-methacryloxypropylmethyldimethoxysilane, N-(β-aminoethyl)-γ-aminopropyltrimethoxysilane, N-(β-aminoethyl)-γ-aminopropylmethyldimethoxysilane, γ-aminopropyltrimethoxysilane, γ-aminopropyltriethoxysilane, N-phenyl-γ-aminopropyltrimethoxysilane, γ-mercaptopropyltrimethoxysilane, γ-chloropropyltrimethoxysilane, γ-chloropropylmethyldimethoxysilane, and γ-chloropropylmethyldichlorosilane. A silane coupling agent having a perfluoroalkyl group can also be used.

Titanate coupling agents include, for example, isopropylisostearyl titanate, isopropyltris(dioctyl pyrophosphate) titanate, tetraoctylbis(ditridecyl phosphate)titanate, tetra(2, 2-dialkyloxymethyl-1-butyl)bis(ditridecyl)phosphate titanate, bis(dioctyl pyrophosphate) oxyacetate titanate, and isopropyltri (N-aminoethyl-aminoethyl) titanate.

Silicone oils and silicone resins can be selected from general lubricating and releasing silicone oils and resins. Considering the cohesive force with the low-refractive index material, those having functional groups such as epoxy groups, alkyl groups, amino groups, carboxyl groups, and alcohol groups at the molecular side chain or terminal are preferable. Furthermore, fluorine-modified products can also be used. To improve the wettability with the low-refractive index layer and to prevent the unevenness of coating, various surfactants can be used, and anionic and nonionic surfactants are preferable.

Surfactants having a perfluoroalkyl group are preferable because they enhance the solubility of the perfluoroalkyl ether compound as the stainproofing component of the present invention.

The amount of these additives is preferably 30% by weight or less, and more preferably 10% by weight or less, based on the perfluoroalkyl ether compound. When the amount is 30% by weight or more, the stainproofing properties are lowered, and it becomes difficult to coat the coating composition uniformly, thereby impairing excellent stainproofing properties of the present invention.

The low-refractive index layer in the present invention is a silica film formed by the sol-gel method in view of improvement in contact adhesion with the stainproofing layer. The sol-gel method refers to a method of hydrolyzing and polycondensing an alkoxysilane such as tetraethoxysilane (TEOS), tetramethoxysilane, and terabutoxysilane using an acid catalyst to prepare a silica sol, coating with the silica sol, followed by heating and further drying to form a silica film. As the acid catalyst, for example, there can be used hydrochloric acid, sulfuric acid, nitric acid, acetic acid, hydrofluoric acid, phosphoric acid, oxalic acid, phthalic acid, and maleic acid. In the above film forming method, alcohols such as methanol, ethanol, propanol, and butanol; ethylene glycol, hexyl glycol, triethanolamine, and xylene can be used as the solvent. Excellent durability of the stainproofing layer can be attained only by forming such a low-refractive index layer and forming the above stainproofing layer thereon, and sufficient durability of the stainproofing properties cannot be obtained when the silica layer is a silica film formed by the deposition method or sputtering method. The reason is as follows. The number of chemical bond sites with the perfluoroalkyl ether compound of the silica film obtained by the sol-gel method is larger than that of the silica film obtained by the deposition or sputtering method so that the contact adhesion with the stainproofing layer is improved. It is considered that there is also an effect exerted by the difference in surface shape between the silica film obtained by the sol-gel method and the silica film obtained by the deposition or sputtering method, but the details are unclear. To improve the contact adhesion and to lower the refractive index, various silane coupling agents, colloidal silica, magnesium fluoride sol, and alkylalkoxysilane fluoride are preferably added to the sol-gel coating composition, in addition to the alkoxysilane such as TEOS.

The anti-reflective material of the present invention is formed by laminating at least a low-refractive index layer and a stainproofing layer in order on a transparent substrate. As the transparent substrate, for example, there can be used plates or films made of glass or plastic which have widely been used in homes, offices, automobiles, and displays. As the plastic film, for example, PET (polyethylene terephthalate) and TAC (triacetylcellulose) are preferable in view of the mechanical strength and optical transparency. It is said that the glass has silanol groups on its surface. It is considered that PET and TAC have functional groups such as hydroxyl groups, carboxyl groups, ester groups, and aromatic rings on its surface.

In the present invention, a hard coat layer can be optionally formed between the transparent substrate and low-refractive index layer. The hard coat layer is cured by radiation and/or heat. Using general hard coat materials such as acrylic-, silicone-, and acrylic-silicone-based materials, the hard coat layer can be formed on the transparent substrate. Specific examples thereof include, but are not limited to, "ARONIX UV-3700" manufactured by Toagosei Co., Ltd., and "UVHC8553" manufactured by Toshiba Silicone Co., Ltd. It is preferable that these materials have hard coating properties with a pencil hardness of 3H or higher (JIS K5400), and the coating thickness is within a range of 0.5–10 $\mu$m. When the thickness is 0.5 $\mu$m or less, sufficient hard coating properties are not exhibited. On the other hand, a thickness of 10 $\mu$m or more is not preferred because cracks occur. For the purpose of lowering the reflectance and improving the contact adhesion with the transparent substrate, various materials may be added as far as the hard coating properties of the resin are not lowered.

In the anti-reflective material of the present invention, the transparent substrate can be coated with a coating composition for each layer using various methods used in a conventional coating operation. Usable coating methods include, but are not limited to, the spin coating method, dipping method, flood coating, gravure method, flexo method, Mayer bar method, microgravure method, spray method, kiss-roll method, air knife method, blade method, and three-roll method, and the optimum method is preferably selected considering the kind, shape, and size of the coating materials, the coating compositions, and the physical properties. The drying conditions must be optimized considering the vapor pressures and boiling points of the solvents to be used. Since the mixed solvent of the coating composition for the stainproofing layer used in the present invention has a boiling point within a range of 50 to 150° C., and the coating weight of the stainproofing layer required to obtain sufficient stainproofing performance is considerably small, the solvent can be dried comparatively easily. To firmly bond the stainproofing layer to the low-refractive index layer, the curing conditions must be optimized according to the type of functional group of the perfluoroalkyl ether compound. In case where the perfluoroalkyl ether compound has an alkoxysilane at the terminal, and the stainproofing layer is chemically bonded with the low-refractive index layer through a silanol bond, the material is preferably heated at 100–200° C. for several hours or allowed to stand in a high-humidity atmosphere for several days to several weeks. When using a stainproofing component having an isocyanate group at the terminal, curing is preferably conducted at 30–70° C. for several days to several weeks. To improve the contact adhesion between the respective layers and to improve the wettability of the coating composition, the substrate surface or surface to be coated can be subjected to a plasma or corona treatment.

EXAMPLES

The following Examples further illustrate the present invention in more detail, but the present invention is not limited by the Examples. The stainproofing components (components 1 to 5), fluorine-based solvents (solvents A1 to A4), and non-fluorine-based solvents (solvents B1 to B5) used in the coating composition for stainproofing layer in the preparation of the anti-reflective materials of the Examples and Comparative Examples of the present invention are respectively shown in Tables 2, 3, and 4 below. In the Examples, "parts" are by weight unless otherwise stated.

TABLE 2

| Stainproofing components | Structural formula | Molecular weight |
|---|---|---|
| Component 1 | $(C_2H_5O)_3Si(CH_2)_3NHCOCF_2(OCF_2CF_2)_m(OCF_2)_nOCF_2CONH—(CH_2)_3Si(OC_2H_5)_3$ | about 2000 |
| Component 2 | $F(CF_2CF_2CF_2O)_nCF_2CF_2CONH(CH_2)_3Si(OC_2H_5)_3$ | about 3600 |
| Component 3 | $HOCOCF_2(OCF_2CF_2)_m(OCF_2)_nOCF_2COOH$ | about 2000 |

TABLE 2-continued

| Stainproofing components | Structural formula | Molecular weight |
|---|---|---|
| Component 4 | OCN—Ar—NHCOCF$_2$(OCF$_2$CF$_2$)$_m$(OCF$_2$)$_3$OCF$_2$CONH—Ar—NCO<br>Ar: aromatic ring | about 1500 |
| Component 5 | CF$_3$(CF$_2$)$_7$CH$_2$CH$_2$Si(OCH$_3$)$_3$ | 536 |

In Table 2, "molecular weight" refers to an average molecular weight. That is, n and m in the structural formula of Table 2 are not specifically Limited to any one number. These components are specified by the molecular weight.

TABLE 3

| Fluorine-based solvent | | Structural formula | Boiling point |
|---|---|---|---|
| Solvent A1 | HFE-7100 (3M Co.) | C$_4$F$_9$OCH$_3$ | 60° C. |
| Solvent A2 | HFE-7200 (3M Co.) | C$_4$F$_9$OC$_2$H$_5$ | 78° C. |
| Solvent A3 | HFC-43-10mee VERTREL XF (Du Pont Co.) | CF$_3$CHFCHFCF$_2$CF$_3$ | 55° C. |
| Solvent A4 | ZEORORA H (Nippon Zeon Co., Ltd.) | CF$_2$CF$_2$CF$_2$CHFCH$_2$ (ring) | 82.5° C. |

TABLE 4

| Non-fluorine-based solvent | | Structural formula | Boiling point |
|---|---|---|---|
| Solvent B1 | Methanol | CH$_3$OH | 63.9° C. |
| Solvent B2 | IPA | (CH$_3$)$_2$CHOH | 82.6° C. |
| Solvent B3 | MEK | CH$_3$COCH$_2$CH$_3$ | 79.6° C. |
| Solvent B4 | MIBK | CH$_3$COCH$_2$CH(CH$_3$)$_2$ | 115.9° C. |
| Solvent B5 | THF | CH$_2$CH$_2$CH$_2$CH$_2$O (ring) | 66° C. |

Example 1

One surface of a transparent substrate of a triacetylcellulose (TAC) film having a thickness of 75 μm was coated with a coating composition for hard coat layer of the following formulation using a reverse coating process method, followed by drying with heating and further ultraviolet curing to form a hard coat layer having a thickness of 3.5 μm. Then, the hard coat layer was coated with a coating composition for a low-refractive index layer of the following formulation using a microgravure method, followed by curing with heating at 100° C. for two hours to form a low-refractive index layer having a thickness of 0.1 μm.

[Formulation of Coating Composition for Hard Coat Layer]
Urethane acrylate: 70 parts by weight (manufactured by Shin-Nakamura Chemical Co., Ltd., under the trade name of "NK OLIGOMER-U-15HA")
Pentaerythritol triacrylate: 30 parts by weight (manufactured by Kyoeisha Chemical Co., Ltd., under the trade name of "LIGHT ACRYLATE PE-3A")
Photoradical polymerization initiator: 3 parts by weight (manufactured by Merck & Co., Inc., under the trade name of "DAROCUR 1173")
MEK: 150 parts by weight
Toluene: 100 parts by weight
[Formulation of Coating Composition for Low-refractive Index Layer]
Methanol dispersion of Colloidal silica: 10 parts by weight (content of solid SiO$_2$ having a particle diameter of 15 nm: 30%, manufactured by Nissan Chemical Industries Co., Ltd. under the trade name of "SNOWTEX", methanol silica sol)
Hydrolysate-containing ethanol solution of tetraethoxysilane: 50 parts by weight (content of solid SiO$_2$: 6%)
Ethanol solution of maleic acid: 3 parts by weight (content of 20%)
Ethanol: 300 parts by weight Then, the above low-refractive index layer was coated with a coating composition for stainproofing layer, which was prepared by dissolving the stainproofing component 1 shown in Table 2 in the fluorine-based solvent A1 shown in Table 3 to form a 0.03% solution, at an assumed film thickness of 3 nm using a Mayer bar method, followed by drying at 100° C. for two hours to prepare the anti-reflective material of Example 1. The formulations of the coating compositions for the stainproofing layer are shown in Table 5, together with the following Examples and Comparative Examples.

Examples 2 to 4

In the same manner as in Example 1, except that the formulations of the coating composition for the stainproofing layer were changed to those shown in Table 5, the anti-reflective materials of Examples 2 to 4 were prepared.

Examples 5 to 9

In the same manner as in Example 1, except that the formulations of the coating composition for the stainproofing layer were changed to those shown in Table 5, and the stainproofing layer was formed at an assumed film thickness of 4 nm, the anti-reflective materials of Examples 5 to 9 were prepared.

Example 10

In the same manner as in Example 1, except that the formulation of the coating composition for the stainproofing layer was changed to that shown in Table 5, and the stainproofing layer was formed at: an assumed film thickness of 5 nm, the anti-reflective material of Example 10 was prepared.

Example 11

In the same manner as in Example 1, Except that the formulation of the coating composition for the stainproofing layer was changed to that shown in Table 5, and the stainproofing layer was formed at an assumed film thickness of 12 nm, an anti-reflective material of Example 11 was prepared.

Example 12

In the same manner as in Example 1, except that the formulation of the coating composition for the stainproofing layer was changed to that shown in Table 5, and the stainproofing layer was formed at an assumed film thickness of 10 nm, an anti-reflective material of Example 12 was prepared.

Example 13

In the same manner as in Example 1, except that the formulation of the coating composition for the stainproofing layer was changed to that shown in Table 5, and the stainproofing layer was formed at an assumed film thickness of 17 nm, an anti-reflective material of Example 13 was prepared.

Comparative Example 1

A film of indium-tin oxide (ITO) was formed on one surface of a transparent substrate made of a PET film having a thickness of 100 um at a thickness of 120 nm using a vacuum deposition method, and furthermore a $SiO_2$ layer having a thickness of 70 nm was formed thereon by deposition.

As shown in Table 5, a stainproofing layer was then formed on the $SiO_2$ layer in the same manner as in Example 1 to prepare the anti-reflective material of Comparative Example 1.

Comparative Example 2

As shown in Table 5, a stainproofing layer was formed on the $SiO_2$ layer in Comparative Example 1 in the same manner as in Example 5 to prepare the anti-reflective material of Comparative Example 2.

Comparative Example 3

In the same manner as in Example 10, except that the low-refractive index layer was changes to that formed by depositing a $SiO_2$ layer having a thickness of 70 nm using a vacuum deposition method in Example 10, the anti-reflective material of Comparative Example 3 was prepared as shown in Table 5.

Comparative Example 4

As shown in Table 5, a stainproofing layer was formed on the $SiO_2$ layer in Comparative Example 3 in the same manner as in Example 11 to prepare the anti-reflective material of Comparative Example 4.

Comparative Example 5

In the same manner as in Example 1, except that the formulation of the coating composition for the stainproofing layer was changed to that shown in Table 5, the anti-reflective material of Comparative Example 5 was prepared.

Comparative Example 6

In the same manner as in Example 1, except that no stainproofing layer was formed, the anti-reflective material of Comparative Example 6 was prepared.

The compositions of the stainproofing layers in the above Examples and Comparative Examples are shown in Table 5. The assumed film thickness of the stainproofing layer formed by coating and drying the coating composition for stainproofing layer is determined by calculation of the known wet coating weight, concentration of the stainproofing component in the coating composition, and specific gravity of the stainproofing component.

TABLE 5

| | Formulation of coating composition for stainproofing layer | | | | | Assumed film |
|---|---|---|---|---|---|---|
| | | Solvent | | | Concentration of | thickness of |
| | Stainproofing component (see Table 2) | Fluorine-based solvent (A) (see Table 3) | Non-fluorine-based solvent (B) (see Table 4) | Incorporation ratio (A/B) | stainproofing component (% by weight) | stainproofing layer (nm) |
| Example 1 | Component 1 | Solvent A1 | — | 100/0 | 0.03 | 3 |
| Example 2 | Component 1 | Solvent A2 | — | 100/0 | 0.03 | 3 |
| Example 3 | Component 1 | Solvent A3 | — | 100/0 | 0.03 | 3 |
| Example 4 | Component 1 | Solvent A4 | — | 100/0 | 0.03 | 3 |
| Example 5 | Component 1 | Solvent A2 | Solvent B1 | 30/70 | 0.04 | 4 |
| Example 6 | Component 1 | Solvent A2 | Solvent B2 | 30/70 | 0.04 | 4 |
| Example 7 | Component 1 | Solvent A2 | Solvent B3 | 30/70 | 0.04 | 4 |
| Example 8 | Component 1 | Solvent A2 | Solvent B4 | 30/70 | 0.04 | 4 |
| Example 9 | Component 1 | Solvent A2 | Solvent B5 | 30/70 | 0.04 | 4 |
| Example 10 | Component 1 | Solvent A2 | Solvent B3 | 10/90 | 0.04 | 5 |
| Example 11 | Component 2 | Solvent A3 | Solvent B1 | 40/60 | 0.7 | 12 |
| Example 12 | Component 3 | Solvent A3 | — | 100/0 | 0.1 | 10 |
| Example 13 | Component 4 | Solvent A4 | Solvent B4 | 30/70 | 0.2 | 17 |
| Comp. Example 1 | Component 1 | Solvent A1 | — | 100/0 | 0.03 | 3 |
| Comp. Example 2 | Component 1 | Solvent A2 | Solvent B1 | 30/70 | 0.04 | 4 |
| Comp. Example 3 | Component 1 | Solvent A2 | Solvent B3 | 10/90 | 0.04 | 5 |
| Comp. Example 4 | Component 2 | Solvent A3 | Solvent B1 | 40/60 | 0.7 | 12 |
| Comp. Example 5 | Component 5 | Solvent A2 | — | 100/0 | 0.03 | 3 |

The characteristics of the anti-reflective materials obtained in the above Examples and Comparative Examples, were evaluated by the following procedures. The results are shown in Table 6.

(1) Appearance of Coated Film

The appearance of the surface of the stainproofing layer was observed, and the presence or absence of unevenness of coating was examined.

○: Unevenness of coating is not found on the surface of the stainproofing layer.
Δ: Slight unevenness of coating is observed.
X: Clear unevenness of coating is observed.

(2) Stainproofing Properties (4) Solvent Resistance

No treatment: Water droplets were dropped on the surface of the stainproofing layer, and then the contact angle was measured using a contact angles meter ("ERMA G-I" type contact angle meter manufactured by ERMA Co.).

Treatment with ethanol: After rubbing the surface of the stainproofing layer 20 times under a load of 500 g/cm$^2$ using a cotton nonwoven fabric impregnated with ethanol, water droplets were dropped, and the contact angle was measured by using a contact angle meter ("ERMA G-I" type contact angle meter manufactured by ERMA Co.).

TABLE 6

|  | Appearance of coated film | Stainproofing properties | | Abrasion resistance | | Solvent resistance | |
|---|---|---|---|---|---|---|---|
|  |  | Felt pen | Fingerprint staining | Felt pen | Fingerprint staining | Contact angle in case of no ethanol treatment (°) | Contact angle in case of ethanol treatment (°) |
| Example 1 | ○ | ○ | ○ | ○ | ○ | 102 | 101 |
| Example 2 | ○ | ○ | ○ | ○ | ○ | 104 | 104 |
| Example 3 | ○ | ○ | ○ | ○ | ○ | 101 | 100 |
| Example 4 | ○ | ○ | ○ | ○ | ○ | 101 | 101 |
| Example 5 | ○ | ○ | ○ | ○ | ○ | 100 | 100 |
| Example 6 | ○ | ○ | ○ | ○ | ○ | 100 | 99.5 |
| Example 7 | ○ | ○ | ○ | ○ | ○ | 101 | 102 |
| Example 8 | ○ | ○ | ○ | ○ | ○ | 100 | 99 |
| Example 9 | ○ | ○ | ○ | ○ | ○ | 102 | 101.5 |
| Example 10 | ○ | ○ | ○ | ○ | ○ | 102 | 101 |
| Example 11 | ○ | ○ | ○ | ○ | ○ | 109 | 109 |
| Example 12 | ○ | ○ | ○ | ○ | ○ | 99 | 97 |
| Example 13 | ○ | ○ | ○ | ○ | ○ | 100 | 99 |
| Comp. Example 1 | ○ | ○ | ○ | Δ | X | 103 | 100 |
| Comp. Example 2 | ○ | ○ | ○ | Δ | X | 100 | 94 |
| Comp. Example 3 | ○ | ○ | ○ | Δ | X | 102 | 100 |
| Comp. Example 4 | ○ | ○ | ○ | ○ | X | 108 | 100 |
| Comp. Example 5 | Δ | Δ | X | X | X | 92 | 90 |

Staining with a felt pen: After drawing a line on the surface of the stainproofing layer using a felt pen, the state of repellency of ink was observed, and ink was wiped off using a piece of tissue paper.

○: The surface of the stainproofing layer repels ink, and ink can be wiped off.
Δ: The surface of the stainproofing layer repels ink, but ink cannot be wiped off.
X: The surface of the stainproofing layer does not repel ink.

Staining with fingerprints: The surface of the stainproofing layer was stained with fingerprints, and the fingerprints were wiped off using a piece of tissue paper.

○: Fingerprints can be completely wiped off.
Δ: Fingerprints not readily wiped off.
X: Fingerprints cannot be wiped off.

(3) Abrasion Resistance

To evaluate the durability to rubbing of the stainproofing layer, the surface of the stainproofing layer was rubbed 500 times under a load of 500 g/cm$^2$ using a nonwoven fabric, and then staining with a felt pen and staining with fingerprints were evaluated in the same manner as in evaluation (2) above.

As is apparent from the results of Table 6, the anti-reflective materials of Examples 1 to 13 according to the present invention showed excellent characteristics in all the categories of appearance of the coated film, stainproofing properties, abrasion resistance, and solvent resistance. On the contrary, the anti-reflective material, of Comparative Examples 1 to 4, wherein a film of SiO$_2$ was formed as the low-refractive index layer by deposition, were not fit for practical use over long periods because of insufficient abrasion resistance due to poor contact adhesion between the low-refractive index layer and the stainproofing layer, and poor solvent resistance. Furthermore, the anti-reflective material using a stainproofing component having no perfluoroalkyl ether group of Comparative Example 5 was inferior in both the appearance and stainproofing properties.

To examine changes in the reflectance before and after forming the stainproofing layer, the reflectance of the anti-reflective materials of Example 1 and Comparative Example 6 was measured for specular reflection at an incidence angle of 5° over a wavelength range of 400 to 700 nm using a UVPC3100 spectrophotometer (manufactured by Shimadzu Corp). As a result, the reflectance of Example 1 was 1.26%, and that of Comparative Example 6 was 1.40%. Therefore, the anti-reflective material of Example 1 according to the present invention showed a lower reflectance than that of the anti-reflective material provided with no stainproofing layer of Comparative Example 6, and showed an improved anti-reflective effect.

What is claimed is:

1. An anti-reflective material comprising a transparent substrate and at least a low-refractive index layer and a stainproofing layer laminated in order on said transparent substrate, wherein said low-refractive index layer is a silica film formed by the sol-gel method, and said stainproofing layer has a dry coat thickness of more than 0.1 nm and contains at least one perfluoroalkyl ether compound having a molecular weight of more than 500.

2. An anti-reflective material in accordance with claim 1, wherein said perfluoroalkyl ether compound has one or more functional groups having an affinity with silica and/or chemically bonding functional groups at the molecular terminal.

3. An anti-reflective material in accordance with claim 1, wherein said perfluoroalkyl ether compound is represented by the following formula 1 and/or formula 2:

| | |
|---|---|
| Rf-$R^1$-$X^1$ | formula 1 |
| $X^2$-$R^2$-Rf-$R^1$-$X^1$ | formula 2 | wherein Rf represents a perfluoroalkyl ether group, $R^1$ and $R^2$ represent a divalent organic group, $X^1$ and $X^2$ represent a monovalent group having a functional group having an affinity with silica and/or a chemically bonding functional group, and $R^1$ and $R^2$, $X^1$ and $X^2$ 2 may be the same or different.

4. An anti-reflective material in accordance with claim 2, wherein said functional group having an affinity with silica and/or chemically bonding functional group is at least one functional group selected from the group consisting of a carboxyl group, carboxylic group, phosphoric group, phosphate group, sulfonic group, sulfonate group, hydroxyl group, amino group, imino group, ammonium salt group, amide group, thiol group, isocyanate group, chlorosilyl group, and alkoxysilyl group.

5. An anti-reflective material in accordance with claim 3, wherein said functional group having an affinity with silica and/or chemically bonding functional group is at least one functional group selected from the group consisting of a carboxyl group, carboxylic group, phosphoric group, phosphate group, sulfonic group, sulfonate group, hydroxyl group, amino group, imino group, ammonium salt group, amide group, thiol group, isocyanate group, chlorosilyl group, and alkoxysilyl group.

6. An anti-reflective material in accordance with claim 3, wherein the molecular weight of said perfluoroalkyl ether compound is between 500 and 10,000.

7. An anti-reflective material in accordance with claim 1, wherein a hard coat layer is formed between said transparent substrate and said low-refractive index layer.

8. An anti-reflective material in accordance with claim 1, wherein the dry coat thickness of said stainproofing layer is between 0.1 and 50 nm.

9. A display comprising the anti-reflective material of claim 1 on the surface of a display portion.

* * * * *